United States Patent Office 3,477,974
Patented Nov. 11, 1969

3,477,974
PROCESS FOR THE PREPARATION OF ESTER RESINS
Albert W. de Ruyter van Steveninck and Johannes Beevendorp, Delft, Netherlands, assignors to Shell Oil Company, New York, N.Y., a corporation of Delaware
No Drawing. Filed Feb. 21, 1967, Ser. No. 617,514
Claims priority, application Netherlands, Feb. 22, 1966, 6602241
Int. Cl. C08g 23/22; C07c 67/00
U.S. Cl. 260—18
5 Claims

ABSTRACT OF THE DISCLOSURE

Epoxy resin esters are prepared by esterification of glycidyl polyethers of polyhydric phenols with monocarboxylic acids (fatty acids, branched acids) in the presence of a catalyst of the group consisting of organic phosphines, arsines, and stibines (e.g., triphenyl phosphine).

---

Ester resins prepared by esterification of condensation products of epichlorohydrin and polyhydric phenols with fatty acids are known products, which are used on a large scale as binders in paints and varnishes. Ester resins of this type are soluble in hydrocarbons such as xylene, and after application of the coating composition to the surface to be protected provide a hard, flexible and strongly adhesive coating, which is insoluble in solvents owing to cross-linking of the ester resin under the influence of oxygen from the air, or to cross-linking with other resins. The esterification is usually carried out by heating the glycidyl polyethers with fatty acids at 200°–260° C. with removal of the water formed by the reaction. Owing to the long reaction time and the elevated reaction temperature secondary reactions take place as a result of which the color, viscosity and acid number of the resins are often higher than is desirable. A more uniform course of the reaction can be obtained by the addition of small amounts of alkaline substances such as sodium hydroxide, sodium carbonate and the like; in such cases there is often a haze in the end product while the color and the viscosity are not entirely satisfactory.

It has now been found that ester resins having improved properties can be obtained by the addition of small amounts of certain substances.

According to the invention ester resins soluble in xylene are prepared by esterification of glycidyl polyethers of polyhydric phenols with monocarboxylic acids of elevated temperatures with splitting off of water, characterized in that a compound is added to the mixture of glycidyl polyether and monocarboxylic acid, which compound has the general formula $$R^1-A-R^2$$
$$|$$
$$R^3$$

in which A is an element from group V–A of the Periodic Table having an atomic weight of between 20 and 150, and $R^1$, $R^2$ and $R^3$ each represent a hydrocarbon group having 1–18 carbon atoms.

The resin ester resins obtained according to the invention are light in color and display very little haze; in addition the viscosity and the acid number are surprisingly low.

As glycidyl polyether of a polyhydric phenol preference is given to a glycidyl polyether of 2,2-bis-(4-hydroxyphenyl) propane. Glycidyl polyethers of this type may be represented by the general formula:

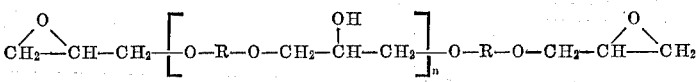

in which R is the divalent group

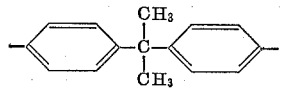

and $n$ is an integer of, for example, 0 to 12. The terminal glycidyl groups can be partially hydrated to

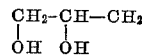

groups by reaction with water during the preparation.

Preference is given to glycidyl polyethers having a molecular weight of 700–4,000 and an esterification value of 100–220. Particular preference is given to glycidyl polyethers of 2,2-bis(4-hydroxyphenyl) propane having molecular weights of 800–2,000. In the preparation of glycidyl polyethers from epichlorohydrin and polyhydric phenol mixtures of polyethers having various molecular weights are formed; it is also possible to start from mixtures of polyethers: the molecular weights given are therefore always average values.

As monocarboxylic acids use may be made of saturated or unsaturated acids having preferably more than 8 carbon atoms per molecule, and mixtures of monocarboxylic acids. Examples are fatty acids from drying oils, such as linseed oil, tung oil, soybean oil, fish oil, cottonseed oil, oiticica oil, perilla oil, sunflower seed oil, and also dehydrated fatty acids from castor oil, tall oil and tall oil fatty acids; moreover, fatty acids from non-drying oils, such as castor oil, coconut oil; lauric acid, 2-ethylhexoic acid, colophony, and saturated aliphatic monocarboxylic acids, in which the carboxyl groups are bound to tertiary and/or quaternary carbon atoms (in this specification for the sake of brevity also referred to as branched monocarboxylic acids).

As saturated aliphatic monocarboxylic acids, in which the carboxyl groups are bound to tertiary and/or quaternary carbon atoms use may very suitably be made of the monocarboxylic acids obtained by reaction of formic acid or of carbon monoxide and water, with olefins under the influence of liquid acid catalysts, such as sulfuric acid, phosphoric acid or complex compounds of phosphoric acid, boron trifluoride and water. Moreover, monocarboxylic acids branched in the alpha position can be obtained by the Reppe process. Preference is given to branched monocarboxylic acids containing more than 8 carbon atoms per molecule. Of particular value are the acids from mono-olefins having 8 to 18 carbon atoms per molecule. It is preferred to start from mixtures of olefins obtained by cracking paraffinic hydrocarbons, for instance petroleum fractions. In these mixtures branched and unbranched acyclic, as well as cycloaliphatic olefis may be present. As a result of the action of formic acid or of carbon monoxide and water a mixture of saturated acylic and cycloaliphatic monocarboxylic acids is obtained from these mixtures.

It is preferred to add 0.2–1.2 millimoles of the compound

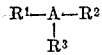

per 100 g. of glycidyl polyether. A is, for example, phosphorus, arsenic or antimony. The groups $R^1$, $R^2$ and $R^3$ can be alkyl, cycloalkyl, alkyl cycloalkyl, aryl and alkaryl groups. Preference is given to phosphines of the general formula $PR_3$, in which R represents an aryl group or an alkyl group having 1–18 carbon atoms, such as triphenyl phosphine, tri-n-butyl phosphine trioctyl phosphine trilauryl phosphine trihexadecyl phosphine and trioctadecyl phosphine. Examples of arsines and stibines are triphenylarsine tricyclohexylarsine, tributylstibine and triphenylstibine.

If desired other alkaline-reacting substances can also be added in small amounts, such as sodium carbonate, sodium bicarbonate, sodium hydroxide, calcium oxide, zinc oxide or salts soluble in organic solvents, for instance the naphthenates of the above metals.

The esterification is preferably carried out in an inert, oxygen-free atmosphere, for example, by passing nitrogen or carbon dioxide through or over the reaction mixture.

The esterification is preferably carried out at temperatures of from 200° C.–260° C.; higher or lower temperatures may also be used at some stages. For example, it is possible to keep the temperature at 150° C.–200° C. to begin with, and to esterify further at temperatures above 200° C., preferably 230°–260° C. Such a choice of reaction temperatures is preferred when branched monocarboxylic acids are first added, followed by unbranched monocarboxylic acids such as ethylenically unsaturated fatty acids.

In the esterification process both epoxy groups and hydroxyl groups react with the monocarboxylic acids. In the case of the reaction of an epoxy group with a carboxyl group it is assumed that first an addition reaction takes place in accordance with the reaction scheme:

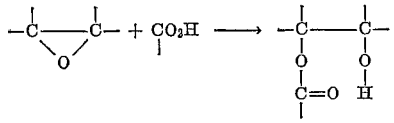

Both hydroxyl groups formed by this reaction and originally present hydroxyl groups then react with monocarboxylic acids in accordance with the reaction scheme:

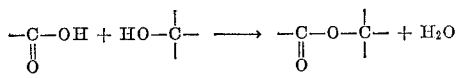

Since the esterification is an equilibrium reaction the water formed has to be removed in order to obtain as complete an esterification as possible. The simplest method is to remove the water in the vapor state by passing a stream of inert gas through it. However, a preferable method is to remove the water by azeotropic distillation with a small amount of xylene, for example 3% by weight, based on the total weight of reactants, the water being separated from the xylene, in a water trap after cooling.

The ester resins prepared according to the invention are solid, semi-solid or highly viscous liquids at room temperature. The viscosity in solution, which is of interest for the applications is usually determined in a 50% or 60% by weight solution in xylene at 25° C.

Ester resins prepared from ethylenically unsaturated fatty acids can be used in air-drying paint compositions, it being possible to accelerate the drying process by means of elevated temperatures and/or the addition of driers, such as cobalt naphthenate, manganese naphthenate, lead naphthenate and calcium naphthenate. Ester resins containing free hydroxyl groups can also be used in baking enamel compositions, together with urea-formaldehyde resins, melamine-formaldehyde resins and the like.

The invention is illustrated by some examples.

The Polyether E used in Examples I–XII was a condensation product of epichlorohydrin with 2,2-bis(4-hydroxyphenyl) propane having the following properties:

Epoxy equivalent weight _____ 950
Esterification value _____ 175
Molecular weight _____ 1400
Free hydroxyl groups (eq./100 g.) _____ 0.36
Viscosity (40% by weight solution in butyl "Dioxitol"):
  By Gardner-Holdt method _____ R–S
Durran softening point, ° C. _____ 99

In the dehydrated castor oil fatty acids the content of conjugated double bonds was 30–35%.

The degree of haze is the percentage of diffused light.

The branched monocarboxylic acids used in Example XIII were obtained by reaction of olefins containing 8 to 10 carbon atoms per molecule with carbon monoxide and water in the presence of a catalyst, consisting of phosphoric acid, boron trifluoride and water, these monocarboxylic acids containing 9 to 11 carbon atoms per molecule, and the carboxyl groups are bound to tertiary and/or quaternary carbon atoms.

EXAMPLE I

In a one-liter reaction flask provided with stirrer, thermometer, gas inlet tube, reflux condenser with water trap, and heating jacket 164 g. of dehydrated castor oil fatty acids (40 parts by weight), 246 g. of Polyether E (60 parts by weight), 40 ml. of xylene, and 0.4 milliequivalents of triphenyl phosphine per 100 g. of Polyether E were heated to 240° C. for 30 minutes with stirring, carbon dioxide being passed through, and maintained at this temperature for 4 hours while the water formed was continuously removed by azeotropic distillation with xylene. The flask with contents was subsequently cooled. The ester resin had the properties shown in Table I.

EXAMPLES II–VII

The esterification was carried out in the manner described in Example I, with the exception that the organic phosphine and the amount thereof were varied as shown in Table I. In these examples ester resins were obtained having the properties shown in Table I.

EXAMPLE VIII

The esterification was carried out as described in Example I, with the exception that no organic phosphine was added; this test was carried out in triplicate.

The esters had the properties shown in Table I; comparison with the esters prepared according to Examples I–VII shows that particularly the acid number and the degree of haze are considerably higher. The viscosity is also noticeably higher, and the ester has a darker color.

TABLE I

| Example | Organic Phosphine | Amount of m. eq. per 100 g. | Acid Number | Viscosity, Poise at 25° C., 60% by Weight in Xylene | Color (Gardner) | Degree of Haze (percent) |
| --- | --- | --- | --- | --- | --- | --- |
| 1 | Triphenyl phosphine | 0.4 | 0.8 | 14.5 | 1 | <2 |
| 2 | do | 0.6 | 0.7 | 12.4 | 1 | <2 |
| 3 | do | 1.0 | 0.3 | 11.5 | <1 | <2 |
| 4 | Tri-n-butyl phosphine | 0.4 | 0.95 | 14.3 | 1 | <2 |
| 5 | do | 1.0 | 0.41 | 11.5 | <1 | <2 |
| 6 | Trilauryl phosphine | 0.4 | 0.87 | 14.0 | 1 | <2 |
| 7 | do | 1.0 | 0.43 | 11.3 | <1 | <2 |
| 8 | No organic phosphine | | 3.2 | 15.7 | 2–3 | 7 |
| | | | 3.4 | 15.9 | 2–3 | 8 |
| | | | 3.5 | 15.3 | 2–3 | 8 |

EXAMPLE IX

In a two-liter reaction flask provided with a gas inlet tube, a downwardly curved tube for water discharge, stirrer, thermometer, and heating jacket, 400 g. of dehydrated castor oil fatty acids, 600 g. of Polyether E, and 0.6 m. eq. of triphenyl phosphine per 100 g. of Polyether E were heated for 30 minutes at 240° C., 2.5 liters of $CO_2$ being passed through per minute, and maintained at this temperature for 4 hours, the water formed being removed with the $CO_2$ stream via the discharge tube. The flask with contents was subsequently cooled. The ester had the properties shown in Table II.

EXAMPLE X

Example IX was repeated with this difference that the Polyether E was gradually added after the flask with dehydrated castor oil fatty acid and triphenyl phosphine had been heated to 160° C.; during the addition the temperature was kept above 150° C. and once all the polyglycidyl ether had been added the reaction mixture was heated to 240° C. over a period of two hours. The properties of the ester are given in Table II.

EXAMPLES XI AND XII

Examples IX and X were repeated with the exception that no triphenyl phosphine was added. The properties of the ester are given in Table II. Comparison with the esters prepared according to Examples IX and X shows that higher values are found for acid number, viscosity, color and degree of haze.

TABLE II

| | | Properties of the Ester | | |
|---|---|---|---|---|
| Example | Triphenyl Phosphine, m. eq./100 g. | Acid Number | Viscosity, Poise at 25° C., 60% by Weight in Xylene | Color (Gardner) | Degree of Haze (percent) |
| 9 | 0.6 | 0.42 | 13.1 | 1 | <2 |
| 10 | 0.6 | 0.38 | 14.0 | 1-2 | <2 |
| 11 | | 2.60 | 16.2 | 2-3 | 9 |
| 12 | | 2.1 | 16.6 | 3-4 | 8 |

EXAMPLE XIII

Into a four-necked flask provided with stirrer, thermometer, gas inlet tube, reflux condenser with water trap, and heating jacket were introduced the following:

1450 g. of a glycidyl polyether of 2,2-bis(4-hydroxyphenyl) propane with 0.212 epoxy equivalents per 100 g., 0.473 equivalents of free hydroxyl groups per 100 g., esterification value 146, and molecular weight 900.

572 g. of branched monocarboxylic acids (3.125 acid equivalent), 3.7 g. of triphenyl phosphine (1.0 m. eq./100 g. of glycidyl polyether) and 0.78 of $Na_2CO_3 \cdot 10H_2O$.

The mixture was maintained at 170° C. for 60 minutes; the acid number was then 5.5. 1925 g. of linseed oil fatty acids were added and the temperature was raised to 240° C., and maintained at this level for 6½ hours, with continuous removal of the water by azeotropic distillation with xylene. The acid number of the ester resin obtained was 21.1.

We claim as our invention:

1. A process for the preparation of ester resins soluble in xylene by the esterification of glycidyl polyethers of 2,2-bis(4-hydroxyphenyl)propane wtih monocarboxylic acids containing more than 8 carbon atoms per molecule at elevated temperature with splitting off of water, characterized in that a single compound is added to the mixture of glycidyl polyether and monocarboxylic acid, which compound has the general formula

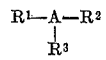

wherein A is an element selected from the group consisting of phosphorus, arsenic and antimony and $R^1$, $R^2$, and $R^3$ each represent a hydrocarbon group having 1-18 carbon atoms.

2. A process as claimed in claim 1, characterized in that a glycidyl polyether having a molecular weight of 700-4,000 and an esterification value of 100-220 is used as starting material.

3. A process as claimed in claim 1, characterized in that 0.2-1.2 millimoles of a compound

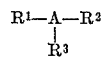

in which A, $R^1$, $R^2$ and $R^3$ have tthe same meanings as in claim 1, are added per 100 g. of glycidyl polyether.

4. A process as claimed in claim 1, characterized in that an organic phosphine is added having the general formula $PR_3$ in which R represents an aryl group or an alkyl group having 1-18 carbon atoms.

5. A process as in claim 1 wherein the monocarboxylic acid is an alpha-branched, saturated, aliphatic monocarboxylic acid containing 9 to 11 carbon atoms.

References Cited

UNITED STATES PATENTS

| 3,377,406 | 4/1968 | Newey et al. | 260—836 X |
| 3,301,743 | 1/1967 | Fekete et al. | 260—862 X |
| 2,970,983 | 2/1961 | Newey | 260—18 X |
| 2,768,153 | 10/1956 | Shokal | 260—47 |
| 2,575,440 | 11/1951 | Bradley | 260—410.5 X |

OTHER REFERENCES

Chemical Abstracts; vol. 65, 7403h; 1966.

DONALD E. CZAJA, Primary Examiner

C. WARREN IVY, Assistant Examiner

U.S. Cl. X.R.

260—410.5